United States Patent
Cheng et al.

(10) Patent No.: US 8,717,972 B2
(45) Date of Patent: May 6, 2014

(54) METHOD FOR RANGE EXTENSION IN WIRELESS COMMUNICATION SYSTEMS

(75) Inventors: Fang-Chen Cheng, Randolph, NJ (US); Jung Ah Lee, Pittstown, NJ (US)

(73) Assignee: Alcatel Lucent, Paris (FR)

( * ) Notice: Subject to any disclaimer, the term of this patent is extended or adjusted under 35 U.S.C. 154(b) by 104 days.

(21) Appl. No.: 12/909,256

(22) Filed: Oct. 21, 2010

(65) Prior Publication Data

US 2011/0103499 A1    May 5, 2011

Related U.S. Application Data

(60) Provisional application No. 61/280,071, filed on Oct. 29, 2009.

(51) Int. Cl.
    *H04B 7/212* (2006.01)

(52) U.S. Cl.
    USPC ........... 370/324; 370/328; 370/329; 370/338; 370/350; 370/503; 370/504; 370/505; 370/506; 370/507; 370/508; 370/509; 370/510; 370/511; 370/512; 370/513; 370/514; 370/515; 370/516; 370/517; 370/518; 370/519; 370/520

(58) Field of Classification Search
    USPC ......... 370/324, 328–329, 338, 350, 503–520; 455/502
    See application file for complete search history.

(56) References Cited

U.S. PATENT DOCUMENTS

| | | | |
|---|---|---|---|
| 6,304,759 B1 * | 10/2001 | Jiang et al. | 455/502 |
| 6,633,559 B1 * | 10/2003 | Asokan et al. | 370/350 |
| 2004/0196811 A1 | 10/2004 | LoGalbo et al. | 370/332 |
| 2005/0025095 A1 | 2/2005 | Kim | 370/329 |

FOREIGN PATENT DOCUMENTS

| | | |
|---|---|---|
| EP | 1 235 367 A2 | 8/2002 |
| WO | WO 2008/150206 | 12/2008 |

OTHER PUBLICATIONS

"RACH in Support of High-Speed UEs," 3GPPTSG-RAN-WG1#46; Tallinn,Estonia, Aug. 28-Sep. 1, 2006 R1-062387.
3rd Generation Partnership Project, Technical Specification Group Radio Access Network; Evolved Universal Terrestrial Radio Access (E-UTRA); Physical Channels and Modulation Release 9 3GPP TS 36.211(Mar. 2010).
International PCT Search Report PCT/US2010/054001 mailed Jan. 20, 2011.
Written Opinion dated Jan. 20, 2011.

* cited by examiner

*Primary Examiner* — Wing F Chan
*Assistant Examiner* — Padma Mundur
(74) *Attorney, Agent, or Firm* — Davidson & Sheehan LLP

(57) ABSTRACT

The present invention provides a method for range extension is wireless communication systems. One embodiment of the method includes determining whether a mobile unit is within a first range corresponding to a range of timing advances supported by a timing advance command. This embodiment also includes transmitting a plurality of timing advance commands to the mobile unit when the mobile unit is outside the first range so that the mobile unit can synchronize with the base station by combining information in the plurality of timing advance commands.

17 Claims, 7 Drawing Sheets

METHOD FOR RANGE EXTENSION IN WIRELESS COMMUNICATION SYSTEMS

CROSS REFERENCE TO RELATED APPLICATIONS

This application is related to U.S. patent application Ser. No. 11/741,068, filed on Apr. 27, 2007. This application also claims benefit of U.S. Provisional Patent Application 61/280,071 filed on Oct. 29, 2009.

BACKGROUND OF THE INVENTION

1. Field of the Invention

This invention relates generally to communication systems, and, more particularly, to wireless communication systems.

2. Description of the Related Art

Wireless communication systems typically include one or more base stations or access points for providing wireless connectivity to mobile units in a geographic area (or cell) associated with each base station or access point. Mobile units and base stations communicate by transmitting modulated radiofrequency signals over a wireless communication link, or air interface. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, control channels, and the like.

Mobile units can initiate communication with the base station by transmitting a message on one or more of the random access channels (RACHs). Uplink random access channels are non-synchronized and therefore may be transmitted at any time relative to the synchronized downlink timing by any mobile unit within the coverage area of the base station. The receiver in the base station must therefore continuously monitor the random access channels and search the signals received on the random access channels for predetermined sequences of symbols (sometimes referred to as the RACH preamble) in random access channels transmitted by mobile units. To make the search process feasible, the format of the random access channels must be standardized. For example, conventional random access channels in the Universal Mobile Telecommunication Services (UMTS) Long Term Evolution (LTE) system are transmitted in a subframe during a transmission time interval (TTI) of 1 ms in 1.08 MHz bandwidth.

The reception times for uplink random access of signals transmitted by mobile units near the center of the cell and mobile units near the edge of the cell can be offset by as much as the round-trip delay corresponding to the cell radius. The offset arises because the non-synchronized random access uplink signals for a particular subframe are transmitted relative to the arrival times of the corresponding synchronized downlink subframe. A mobile unit at the center of the cell receives the synchronized downlink subframe earlier than mobile unit at the edge of the cell (by approximately the one way delay corresponding to the cell radius) and uplink signals transmitted from central mobile units arrive at the base station earlier than uplink signals transmitted from edge mobile units (by approximately the one-way delay corresponding to the cell radius). Inter-symbol interference between random access channels associated with different subframes occurs if random access signals associated with one subframe overlap with a subsequent subframe and therefore interfere with random access signals associated with the subsequent subframe. Inter-symbol interference can be reduced by including a guard time in each random access channel subframe during which no uplink signal is transmitted to reduce or prevent inter-symbol interference. For example, the random access channel subframe can be divided into a 0.8 ms preamble and a 102.6 µs cyclic prefix that includes a copy of a portion of the sequence of symbols in the preamble. The remaining 97.4 µs in the transmission time interval is reserved as a guard time The coverage area of a base station is related to the duration of the cyclic prefix and the guard time. For example, the conventional guard time of approximately 0.1 ms corresponds to a round-trip delay for a signal that travels approximately 15 kilometers. Thus, a random access channel format that includes approximately 0.1 ms for the guard time is appropriate for reducing or preventing inter-symbol interference for coverage areas or cell sizes having a radius of up to approximately 15 kilometers. Similarly, the duration of the cyclic prefix is related to the size of the coverage area. For example, a cyclic prefix of approximately 0.1 ms is suitable for coverage areas having radii of up to approximately 15 kilometers. Although a range of 15 km may be considered sufficient for conventional wireless communication systems, the base station range of proposed wireless communications systems, such as the UMTS LTE, is expected to increase to at least 100 km in scenarios with good radio propagation conditions such as coverage in coastal areas.

Proposals to extend the range of the random access channel supported by base stations include increasing the transmission time interval to 2 ms. For example, one proposal includes changing the structure of random access channels. In this proposal, the extended transmission time interval includes a 0.8 ms RACH preamble. The length of the cyclic prefix (CP) also increases in proportion to the desired coverage area. For example, every 0.1 ms of additional cyclic prefix length will account for additional 15 km coverage. The guard time also increases at the same rate as the cyclic prefix length. Thus, with the 0.8 ms RACH preamble, the time available for guard time and cyclic prefix is 2 ms−0.8 ms=1.2 ms. This RACH range extension proposal attempts to reduce the receiver complexity of the RACH preamble detection. However, the guard time and the cyclic prefix are considered pure overhead because no new information can be transmitted during these intervals. Increasing the guard time or the cyclic prefix length much beyond the current value of 0.1 ms is therefore not considered a desirable way to extend the range of cells because of the high resource cost.

In other proposals, two partitions between cyclic prefix and guard time (or guard period) can be envisioned: In one case, the 1.2 ms portion of the subframe that is not allocated to the preamble could be evenly allocated to the cyclic prefix and the guard time so that the RACH coverage is extended to 90 km. Alternatively, the 1.2 ms portion of the subframe that is not allocated to the preamble could be unevenly distributed between the cyclic prefix length and the guard time. The uneven distribution of the allocated time to the cyclic prefix and the guard time could extend the coverage to the 100 km if the cyclic prefix length is equal to or greater than 0.667 ms. However, inter-symbol interference may occur when the cyclic prefix and guard time allocations are uneven in cases where the preamble is transmitted by a mobile unit near the cell edge. Moreover, the signal strength received from mobile units in the edge of an extended cell, e.g., mobile units that are as much as 90 or 100 km from the base station, may be very low, which may reduce the likelihood of detecting the preamble of the random access channel.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for range extension is wireless communication systems. One embodiment of the method includes determining whether a mobile unit is within a first range corresponding to a range of timing advances supported by a timing advance command. This embodiment also includes transmitting a plurality of timing advance commands to the mobile unit when the mobile unit is outside the first range so that the mobile unit can synchronize with the base station by combining information in the plurality of timing advance commands.

In another embodiment, a method is provided for range extension wireless communication systems. This embodiment of the method includes receiving, at a mobile unit and from a base station, a plurality of timing advance commands when the mobile unit is outside a first range corresponding to a range of timing advances supported by a timing advance command. This embodiment also includes synchronizing the mobile unit to the base station by combining information in the plurality of timing advance commands.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
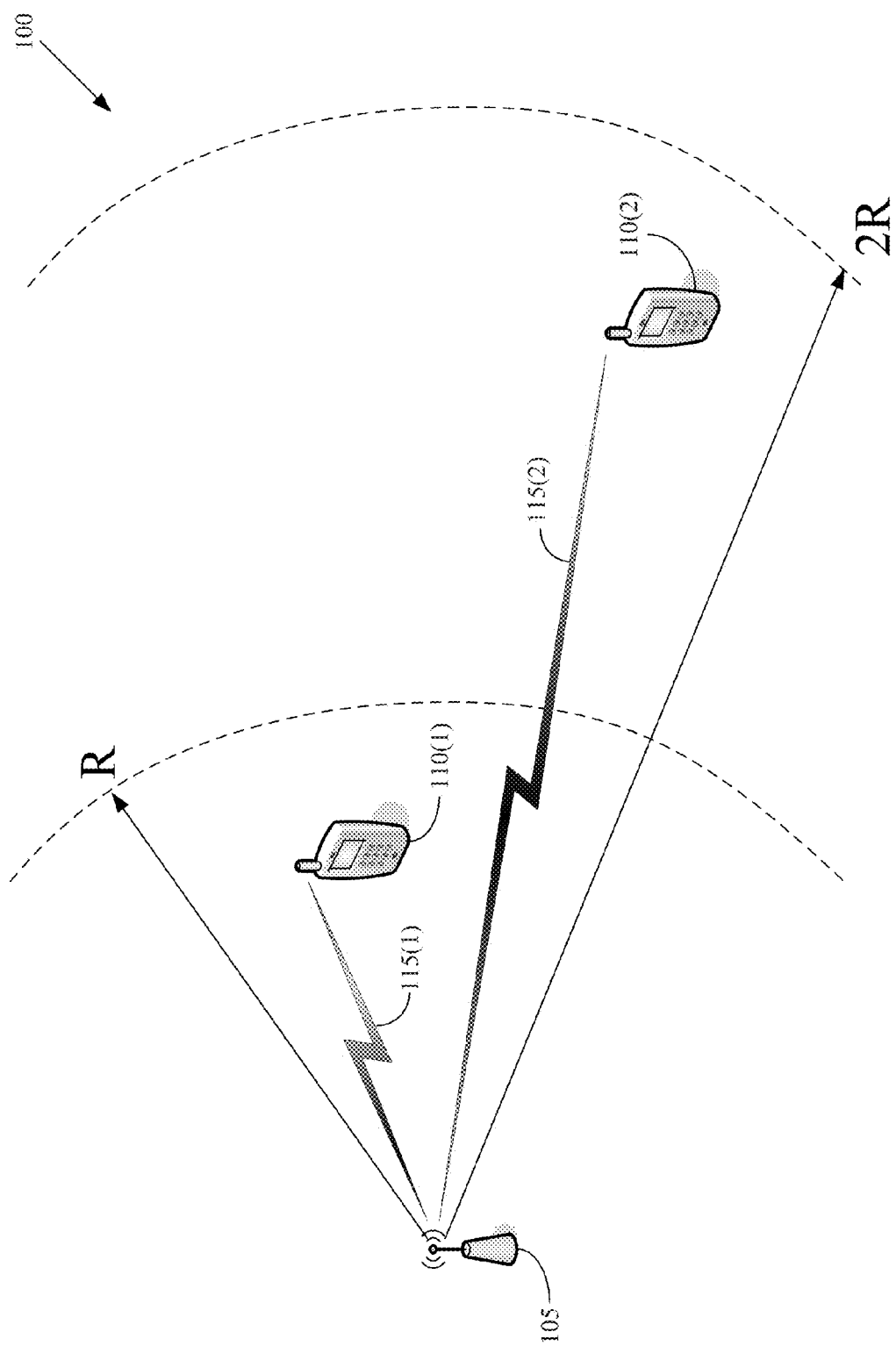
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes techniques that can be used to extend the range of base stations within a wireless communication system. As discussed herein, the range of the base station is related to the structure of random-access preambles that mobile units transmit to signal their presence to the base station. For example, every 0.1 ms of additional cyclic prefix length (and corresponding guard time interval) in the preamble can add an additional 15 km coverage. However, the guard time and the cyclic prefix are considered pure overhead because no new information can be transmitted during these intervals. Increasing the guard time or the cyclic prefix length much beyond the current value of 0.1 ms is therefore not considered a desirable way to extend the range of cells because of the high resource cost.

Other techniques may also be used to support range extension. For example, the Long Term Evolution (LTE) physical layer procedures and physical layer parameters may be designed based on target cell radius of 100 km. Cell range extension to beyond 100 km may be implemented in base stations and/or eNBs: In one embodiment, random-access (RA) preamble detection can be used: The CP length of the RA preamble is designed to support up to 100 km and to allow efficient frequency-domain correlator implementation. To support range extension, the time-domain correlator may be used or, alternatively, the frequency-domain correlator could be used, with tradeoff in detection performance. For PUSCH transmission, limitations in the timing advance (TA) command range may cause the received uplink signals from remote users to lose time alignment and spill over to adjacent subframes, causing interference. For RA message 3, the reception timing of RA message 3 is configurable within a certain window size. The RA message 3 for users in different ranges may be scheduled at different subframes (TDM). Alternatively, FDM may be used. TDM/FDM separation may also be feasible for traffic channels. Over time, the uplink timing offset may be corrected by sending relative TA commands, e.g., when the base station determines that synchronized uplink transmissions are not properly aligned with the base station timing reference. In one embodiment, the eNB receiver can support special handling of the signals from remote users to determine their location relative to the eNB. For example, eNB may place different fast Fourier transform (FFT) windows on the received random-access signals, depending on the range of users (eg. 0-100 km, 100-200 km). The fundamental problem with the above solution is the expected capacity loss. The signals from remote users may spill over in 2 subframes provisioned by the scheduler at least in part because a single timing advance command does not have sufficient range to indicate the needed timing advance for distant users. It would be desirable to be able to align the received signals over a larger range, to avoid the capacity loss.

Embodiments of the techniques described in the present application therefore do not rely on modifying the structure of random-access messages. The techniques described herein may also provide a time alignment mechanism that allows the mobile unit to receive the necessary timing advance information so that the mobile unit can quickly synchronize to the base station. Some embodiments may therefore reduce or eliminate spillover of uplink transmissions into multiple subframes. In one embodiment, base stations can determine whether a mobile unit is separated from the base station by a distance that is within a range of timing advances supported by a timing advance command. If so, the required timing advance for the mobile unit can be signaled using a single timing advance command. If not, the base station can transmit a plurality of timing advance commands to the mobile unit, which can combine the information in the timing advance commands to determine the timing advance used to synchronize to the base station.

FIG. 1 conceptually illustrates one exemplary embodiment of a wireless communication system 100. In the illustrated embodiment, a base station 105 provides wireless connectivity to mobile units 110 over air interfaces or wireless communication links 115. Techniques for establishing, maintaining, operating, de-allocating, and/or tearing down wireless communication links 115 are known in the art and in the interest of clarity only those aspects of establishing, maintaining, operating, de-allocating, and/or tearing down the wireless communication links 115 that are relevant to the claimed subject matter will be discussed herein. Moreover, persons of ordinary skill in the art having benefit of the present disclosure should appreciate that the particular wireless communication systems shown in FIG. 1 is intended to be illustrative and not to limit the claimed subject matter. For example, alternate embodiments of the wireless communication system 100 may include other numbers of base stations 105, and/or mobile units 115.

The base station 105 and the mobile units 110 may initiate wireless communication over the wireless communication links 115 by exchanging random-access messages and timing advance commands. In the illustrated embodiment, the base station 105 and the mobile units 110 are configured to communicate over time-synchronized traffic or data channels. For example, frequency division duplex (FDD) and/or time division duplex (TDD) channels may use a frame structure for uplink and/or downlink transmissions in which each channel is divided into 5 ms or 10 ms frames that are each subdivided into subframes or slots, e.g. 0.5 ms timeslots. However, the base stations 105 and mobile units 110 may not initially be synchronized, at least in part because of the variable (and initially unknown) round-trip time delay between the base station 105 and each mobile unit 110. Signal processing time within the base stations 105 and/or the mobile units 110 may also contribute to the lack of synchronization. As discussed herein, the structure of a random access channel transmitted from a mobile unit 110 to the base station 105 corresponds to the range (R) of the base station 105.

Figure 2:
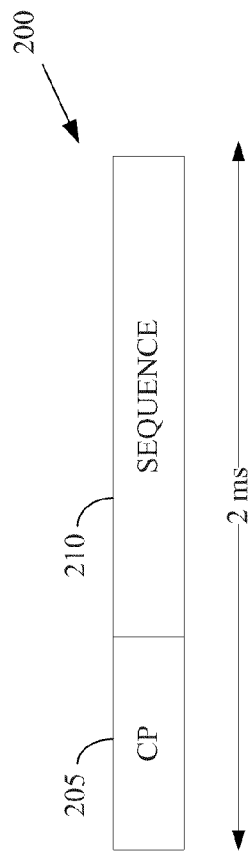
FIG. 2 shows one exemplary embodiment of a random access channel.

FIG. 2 shows one exemplary embodiment of a random access channel 200. In this embodiment, the random access channel 200 includes a cyclic prefix 205 and a transmission sequence 210 that may include the random access channel (RACH) preamble. For example, a physical layer random access preamble (such as the random access channel 200) may consist of a cyclic prefix 205 of length $T_{CP}$ and a sequence part 210 of length $T_{SEQ}$. Exemplary parameter values are listed in Table 1 and depend on the frame structure and the random access configuration. Higher layers in the protocol stack may control the preamble format. The preamble formats listed in Table 1 are defined in accordance with the standards and/or protocols set forth by the Third Generation Partnership Project (3GPP) and, in particular, in 3GPP TS 36.211 v9.1.0, entitled 3GPP Technical Specification Group Radio Access Network, Evolved Universal Terrestrial Radio Access (E-UTRA), Physical Channels and Modulation. The basic time unit ($T_s$) may also be defined in accordance with the 3GPP standards and/or protocols.

TABLE 1

Random access preamble parameters.

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4* | 448 · $T_s$ | 4096 · $T_s$ |

Formats 1 and 3 in Table 1 may be used to achieve range of approximately 100 km because these formats use relatively longer cyclic prefixes. As used herein, the term "approximately" is used to indicate that under perfect conditions the round-trip delay corresponding to the duration of the cyclic prefix for these formats correspond to a range of 100 km. However, environmental conditions and other factors may cause the actual range achieved in practice to vary from this ideal value although persons of ordinary skill in the art would still refer to the range as being "100 km" or "approximately 100 km."

In one embodiment that may be adopted in 3GPP standards and/or protocols, the range of supported TA command may be limited to [0, ..., 1282], e.g., in TS 36.213 and corresponding RAN2 specification TS 36.321. The range of TA command may be extended to [0, ..., 2047] without changing MAC PDU structure using embodiments of the techniques described herein. For example, in case of a random access (RA) response with an 11-bit timing advance command, $T_A$ indicates $N_{TA}$ values by index values of $T_A$=0, 1, 2, ..., 1282, where an amount of the time alignment is given by $N_{TA}=T_A\times 16$ and $N_{TA}$ is defined in the relevant 3GPP specifications. The Timing Advance Command field indicates the index value TA (0, 1, 2 ... 1282) that may be used to control the amount of timing adjustment applied by a mobile unit. In one embodiment, the size of the Timing Advance Command field is 11 bits. Note that 20512=16*1282, as the applicable timing advance may be defined as steps of 16 $T_s$. The base station and the mobile unit can be synchronized using the timing advance so that transmission of the uplink radio frame number i from the mobile unit may start $(N_{TA}+N_{TA\ offset})\times T_s$ seconds before the start of the corresponding downlink radio frame at the mobile unit, where $0\le N_{TA}\le 20512$, $N_{TA\ offset}=0$ for frame structure type 1 and $N_{TA\ offset}=624$ for frame structure type 2. Note that not all slots in a radio frame may be transmitted. One example hereof is TDD, where only a subset of the slots in a radio frame is transmitted.

Figure 3:
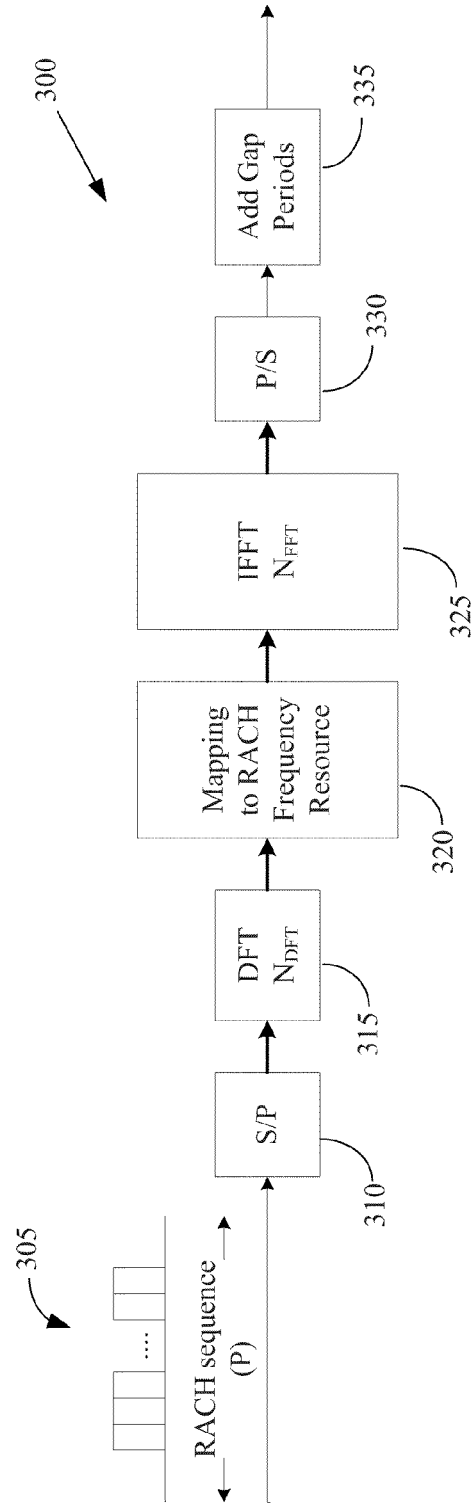
FIG. 3 conceptually illustrates one exemplary embodiment of a transmitter that can be used to transmit RACH preambles such as the random-access channel shown in FIG. 2.

FIG. 3 conceptually illustrates one exemplary embodiment of a transmitter 300 that can be used to transmit RACH preambles such as the random-access channel 200 shown in FIG. 2. In the illustrated embodiment, the transmitter 300 is configured for non-synchronized RACH transmission. For example, a CAZAC sequence of length L can be used as the RACH burst 305. The sequence is converted to frequency domain by discrete Fourier transform (DFT) precoding in a serial/parallel converter 310 and a DFT unit 315. A mapper 320 may then be used to map the precoding signals to appropriate RACH sub-carriers. The sequence may then be converted to time-domain samples by an inverse fast Fourier transform (IFFT) element 325 and then converted (at a parallel/serial converter 330) back to a serial signal stream. In the time domain, zero samples are added in the gap periods before transmission using a gap inserter 335.

Referring back to FIG. 1, the base station 105 can use the received random-access message to estimate the distance between the base station 105 and the mobile unit 110 that transmitted the random-access message. In one embodiment, the base station 105 can correlate the received random-access message with a reference signal. By performing this correlation over a timing window corresponding to the range (R) of the base station, the base station 105 can estimate the relative delay between the timing reference at the base station 105 and the reception time of the random-access message.

Figure 4:
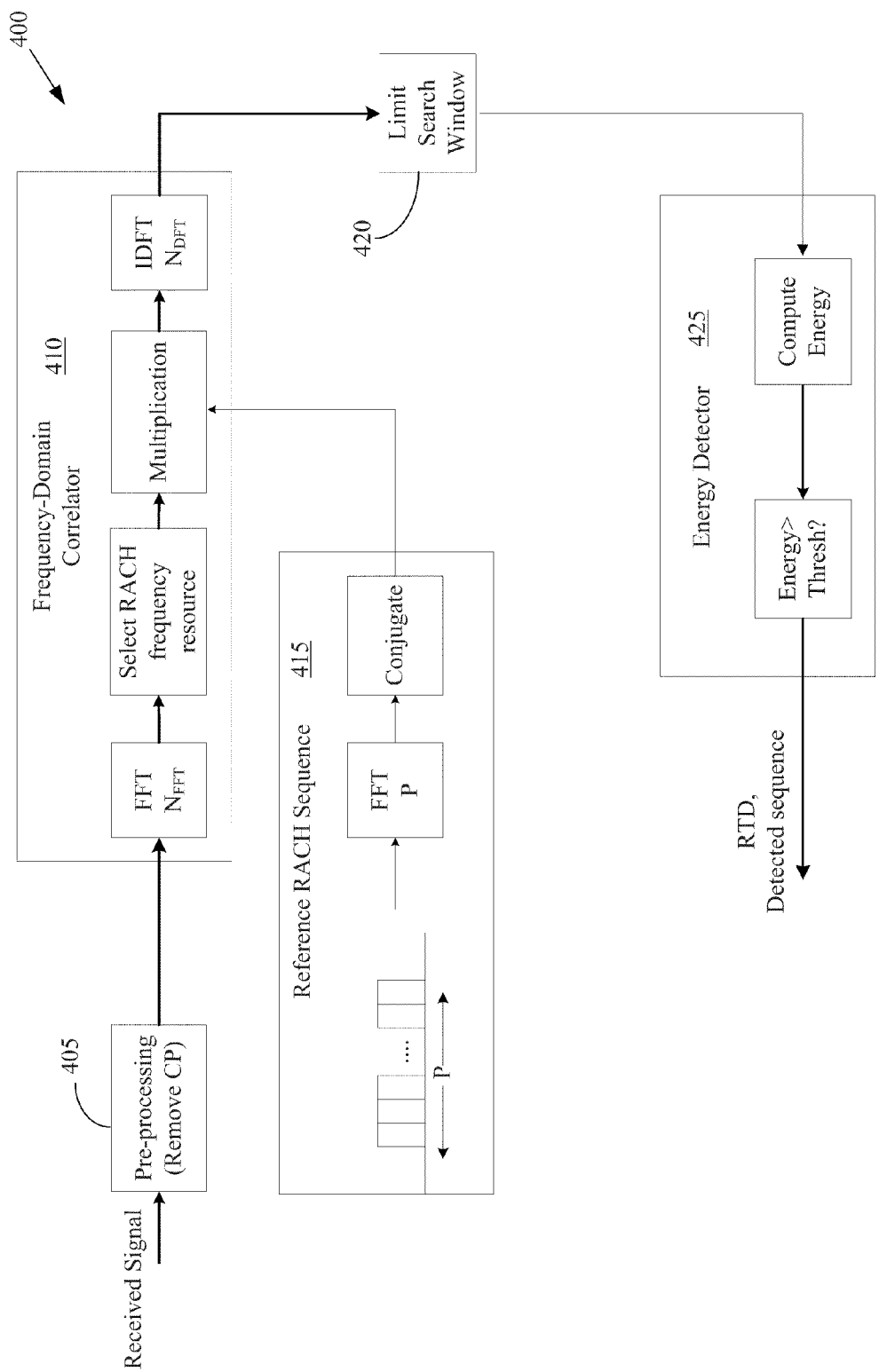
FIG. 4 conceptually illustrates one embodiment of a receiver that can be used to detect a RACH preamble over a range associated with the structure of the RACH preamble.

FIG. 4 conceptually illustrates one embodiment of a receiver 400 that can be used to detect a RACH preamble over a range associated with the structure of the RACH preamble. In the illustrated embodiment, the receiver 400 is configured to detect non-synchronized RACH preambles and FIG. 4 shows a frequency-domain implementation of a correlation detector 400. In the illustrated embodiment, a received signal is pre-processed by an overlap-add operation 405. Then, the signal is converted to frequency-domain by a fast Fourier transform (FFT) element in the frequency-domain correlator 410. After multiplication by the reference RACH sequence 415, the signal is converted back to time-domain using an inverse discrete Fourier transform (IDFT). The time-domain signal energy can then be determined within a limited search window (at 420) and compared with a threshold you in the energy detector 425. If a RACH preamble is detected within the received signal, the output of the receiver 400 indicates an estimate of the round-trip delay of the detected RACH sequence.

Instead of using a single reference sequence 415, alternative embodiments of the frequency domain correlator 410 in alternative embodiments of the receiver 400 may implement a set of parallel RACH preamble detection processes that each detect a disjoint range of possible RACH transmission locations. For example, each of the parallel RACH preamble detection processes may compare the received signal to a plurality of reference signals 1-N. Each of the reference signals 1-N may be used to detect RACH preambles from users in different distance ranges. For example, one reference signal (and associated parallel detection process) may be used to detect users in the range of 0-15 km, another reference signal (and associated parallel detection process) may be used to detect users in the range of 15-30 kilometers, and another reference signal (and associated parallel detection process) may be used to detect users in the range of 30-45 km.

Referring back to FIG. 1, once the base station 105 has estimated the distance to the mobile unit 115 that transmitted the random-access message, the base station 105 can determine a timing advance that may be used to synchronize transmissions between the base station 105 and the mobile unit 115. For example, if the mobile unit 115(1) transmits a random-access message to the base station 105, the base station 105 can determine the round-trip delay to the mobile unit 115(1) and then define an appropriate timing advance that can be used by the mobile unit 115(1) to adjust its timing to synchronize with the base station 105. Timing advance commands may be defined to support a range of values of the timing advance that corresponds to the range (R) of the base station 105. The range of values supported by the timing advance commands therefore may also correspond to the range (R) defined by the structure of the RACH preamble. For example, a timing advance command may include a selected number of bits that can be used to convey different values of the timing advance within the supported range (R).

The range of the base station 105 can be extended by using multiple timing advance commands to convey information that indicates a net timing advance that is larger than the maximum timing advance that can be indicated by a single timing advance command. In the illustrated embodiment, the base station 105 can determine whether a mobile unit 115 is beyond the range (R) that is supported by the timing advance commands and/or the structure of the RACH preambles transmitted by the mobile units 115. The base station 105 can then transmit multiple timing advance commands that indicate the larger values of the timing advance that are needed to synchronize mobile units 115 that are outside of the range (R). For example, the base station 105 can transmit two (or more in some cases) timing advance commands to indicate a value of the timing advance that the mobile unit 115(2) would need to synchronize with the base station 115.

Figure 5:
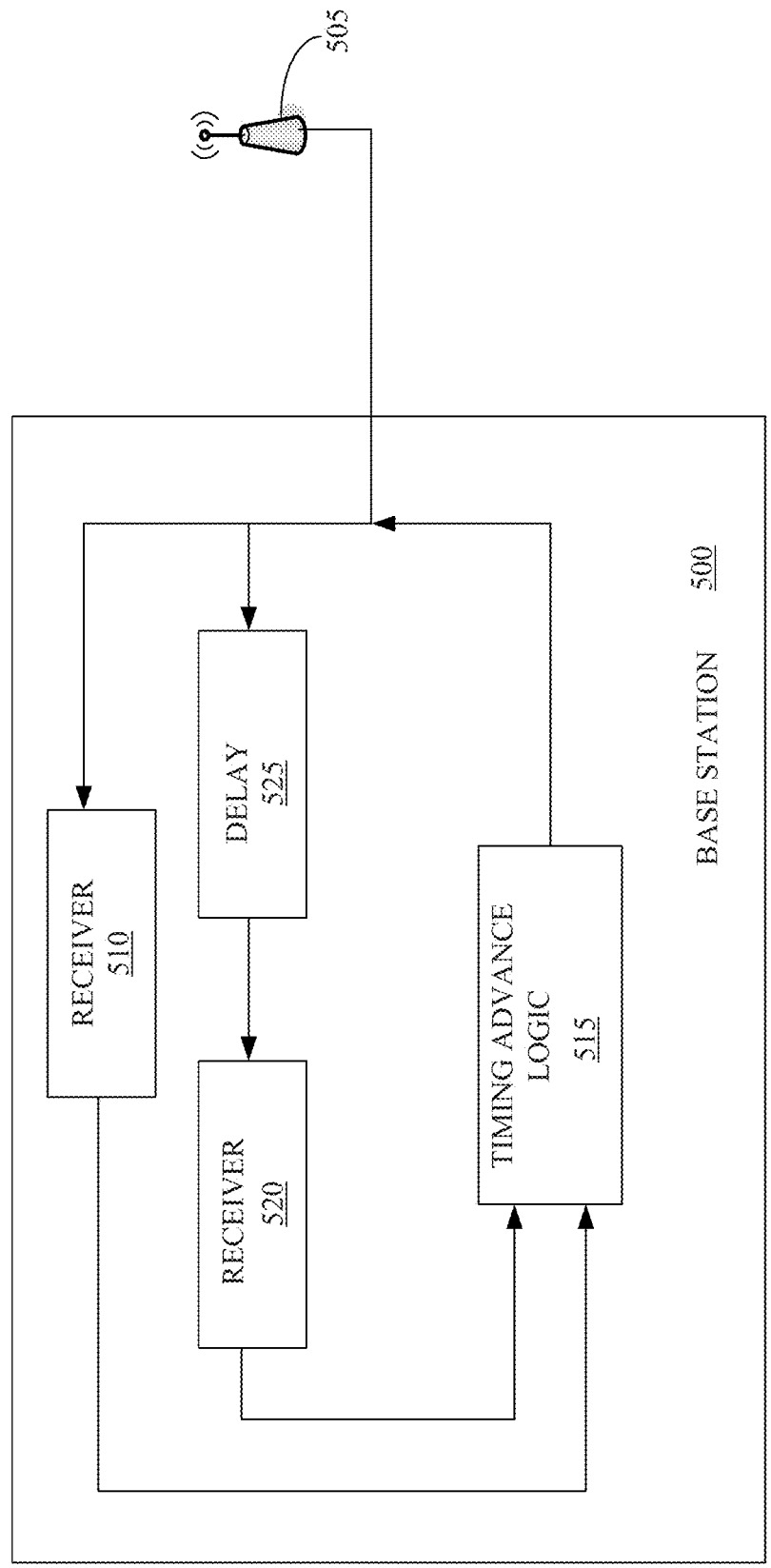
FIG. 5 conceptually illustrates one exemplary embodiment of the base station that can determine whether a mobile unit is within a range supported by a timing advance command and/or a RACH preamble structure used by the mobile unit.

FIG. 5 conceptually illustrates one exemplary embodiment of the base station 500 that can determine whether a mobile unit is within a range supported by a timing advance command and/or a RACH preamble structure used by the mobile unit. In the illustrated embodiment, the base station 500 receives wireless signals at an antenna 505. One version of the received signals are conveyed to a receiver 510 such as the receiver 400 shown in FIG. 4. The receiver 510 is configured to search the received signals within a timing window that corresponds to the range of the base station 500. For example, the receiver 510 can search a timing window that corresponds to round-trip delays for distances in the range 0-100 km. If a RACH preamble is detected within the timing window, then the receiver 510 can estimate the round-trip delay of the received signal and transmit this information to timing advance logic 515, which can generate an appropriate timing advance command that indicates a value of the timing advance that can be used to correct for the round-trip delay and synchronize the base station 500 with the mobile unit. The timing advance command can then be transmitted using the antenna 505.

A receiver 520 may also be used to search the received signals within a timing window that corresponds to distances outside the range supported by the timing advance command and/or the RACH preamble structure used by the mobile unit. In the illustrated embodiment, the received signals are delayed in a delay element 525 by a time that corresponds to the round-trip delay at the maximum range supported by the timing advance command and/or the RACH preamble structure. For example, the delay element 525 may delay the received signals by a round-trip delay corresponding to a range of 100 km. The receiver 520 can then search the delayed signal within a timing window that corresponds to the range supported by the timing advance command and/or the RACH preamble structure. For example, if the received signal is delayed before arriving at the receiver 520, the receiver 520 can search a timing window that corresponds to round-trip delays for distances in the range 100-200 km. If a RACH preamble is detected within the timing window, then the receiver 520 can estimate the round-trip delay of the received signal and transmit this information to timing advance logic 515, which can generate an appropriate set of timing advance commands that, in combination, indicate a value of the timing advance that can be used to correct for the round-trip delay and synchronize the base station 500 with the mobile unit. The timing advance commands can then be transmitted using the antenna 505.

In the illustrated embodiment, the receivers 510, 520 are depicted as separate functional entities within the base station 500. The receivers 510, 520 may therefore concurrently process the received signal and the delayed version of the received signal to search for RACH preambles within the different timing windows. However, in alternative embodiments, the receivers 510, 520 may be representative of a single physical receiver that is configured to perform searches of both the received signal and the delayed version of the received signal. In that case, the physical receiver that implements the receivers 510, 520 may search the received signals in the first window during a first time interval and in a second window during a second time interval.

FIG. 6A conceptually illustrates one exemplary embodiment of a timing advance command 600 that can be used to indicate values of the timing advance. In the illustrated embodiment, the timing advance command 600 includes a plurality of bits 605 that can be used to convey a value of the timing advance. The number of bits 605 may be predetermined and can be selected to allow the timing advance command 600 to convey values of the timing advance within a range such as a range corresponding to the range of a base station and/or the range supported by a RACH preamble structure. The timing advance command 600 may also include one or more reserved bits 610. In the illustrated embodiment, the reserved bit 610 is set to a value of "0."

FIG. 6B conceptually illustrates two timing advance commands 615, 620 that can be combined to signal a timing advance that is larger than the maximum value of the timing advance that can be signaled using the bits in a single timing advance command. For example, each timing advance command 615, 620 may have a bit width that supports a range of allowed index values $T_A$ (0, 1, 2 . . . 1282) that are used to indicate timing advances within range corresponding to the range of a base station and/or the range supported by a RACH preamble structure. To signal larger timing advances, the first timing advance command 615 may transmit an index value outside of the allowed range, e.g., by setting one or more of the reserved bits 610 to a value of "1" to indicate a value of 1283 for the index. When the mobile unit receives the first timing advance command 615, it recognizes that a second timing advance command 620 is going to be transmitted because the index value is outside of the allowed range.

Figure 6:
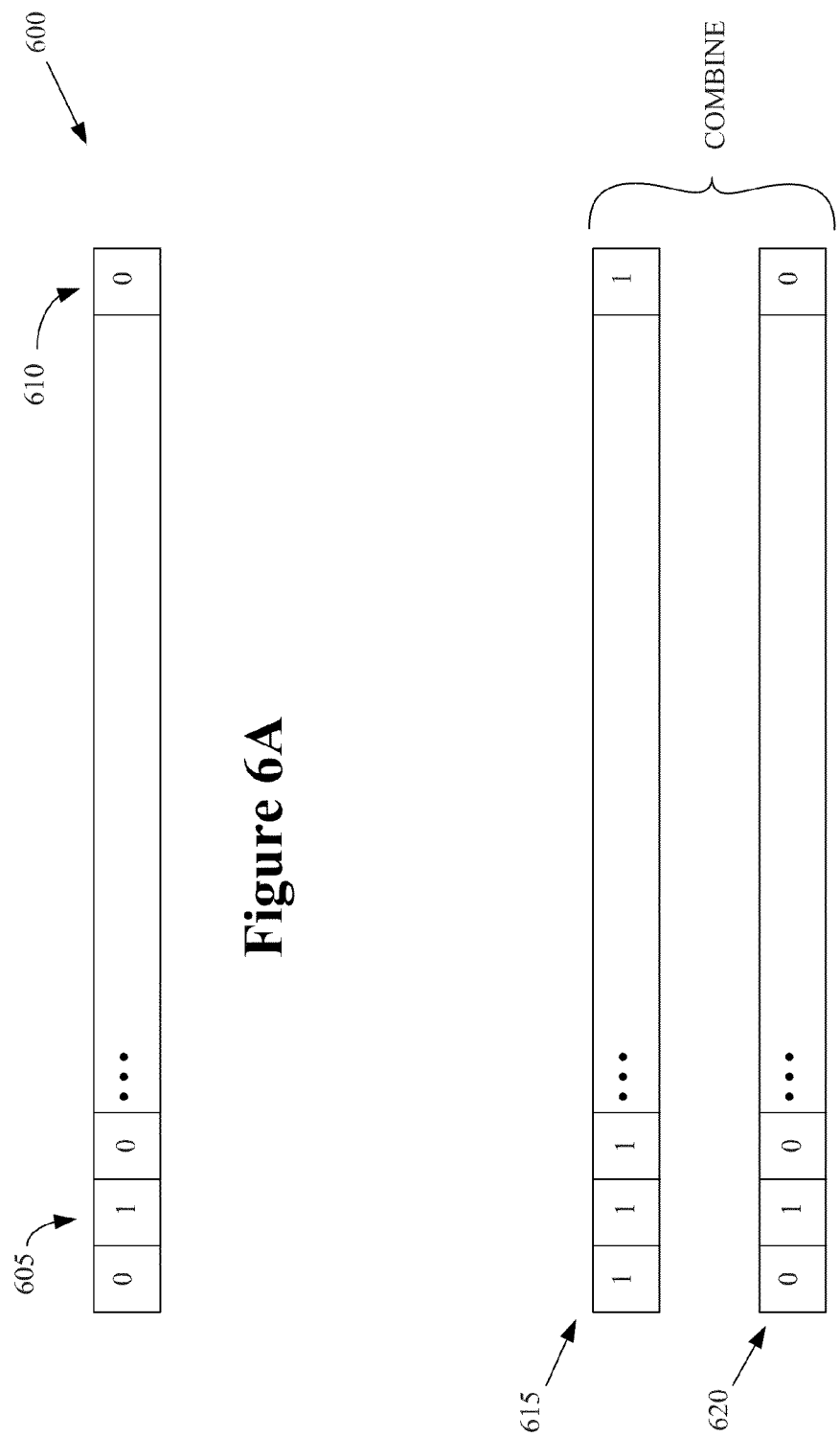
FIG. 6A conceptually illustrates one exemplary embodiment of a timing advance command that can be used to indicate values of the timing advance.
FIG. 6B conceptually illustrates two timing advance commands that can be combined to signal a timing advance that is larger than the maximum value of the timing advance that can be signaled using the bits in a single timing advance command.

The value of the index in the second timing advance command 620 can be selected so that the sum of the maximum value (e.g. 1282) and the value indicated in the second timing advance command is equal to the extended value of the timing advance that is used by mobile units within the extended range to synchronize to the base station. Although two timing advance commands 615, 620 are shown in FIG. 6, alternative embodiments may use more timing advance commands to signal larger values of the timing advance. For example, the second timing advance command 620 may transmit an index value outside of the allowed range, e.g., by setting one or more of the reserved bits 610 to a value of "1" to indicate a value of 1283 for the index. The mobile unit may then know that at least one additional timing advance command is going to be transmitted and that it should combine information in all the timing advance commands to determine the value of the timing advance that should be used in the extended range. Embodiments of this technique may allow the range of a base station to be extended as necessary to larger values by daisy-chaining any number of timing advance commands, which may potentially "future-proof" this approach. Embodiments of such a base station may also be capable of determining mobile unit distances within additional ranges such as 0-100 km, 100-200 km, 200-300 km, etc.

Figure 7:
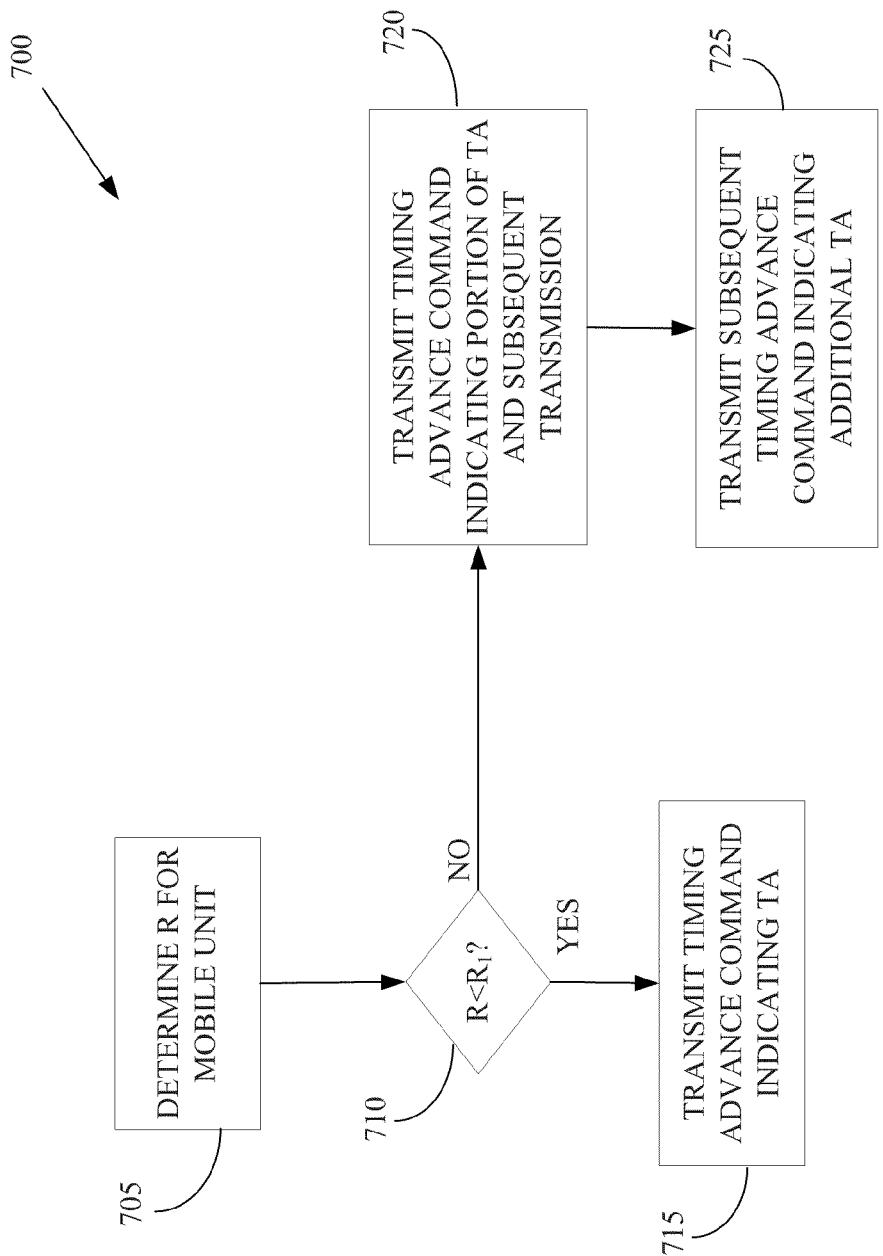
FIG. 7 conceptually illustrates one exemplary embodiment of a method or transmitting timing advance commands to mobile units.

FIG. 7 conceptually illustrates one exemplary embodiment of a method 700 for transmitting timing advance commands to mobile units. In the illustrated embodiment, a base station receives a random-access message from a mobile unit and uses this message to estimate or determine (at 705) a distance or separation (R) between the mobile unit and the base station. For example, during an initial access procedure, the mobile unit may transmit the random access preamble in a pre-determined sub-frame and the base station may use the random access preamble to determine (at 700) the distance (R). The base station can then determine (at 710) whether the mobile unit is within a distance ($R_1$) that corresponds to a distance that is supported by the structure of the preamble and/or a distance that corresponds to the range of timing advances supported by a timing advance command. If the mobile unit is within the distance ($R_1$), then the base station can determine an appropriate timing advance for synchronizing the mobile unit and transmit a timing advance command indicating this timing advance to the mobile unit. In one embodiment, the base station can also concurrently transmit a reference timing signal so that the mobile unit can use the timing advance to synchronize uplink transmissions to the reference timing signal.

Multiple timing advance commands can be transmitted when the base station determines (at 710) that the mobile unit is beyond or outside the distance ($R_1$). In the illustrated embodiment, the base station determines the timing advance needed to synchronize the mobile unit to the base station and transmits (at 720) a timing advance command indicating a portion of the needed timing advance and also indicating that a subsequent timing advance command is to be transmitted. For example, the timing advance command may include a value of 1283 that indicates a timing advance of the maximum value supported by the timing advance command (1282). The value of 1283 in the timing advance command also indicates that another timing advance command is going to be transmitted because the value of 1283 is outside the range (0-1282) supported by the timing advance command. One or more subsequent timing advance commands can then be transmitted (at 725) to indicate the additional timing advance. For example, to indicate a total timing advance of 2000, an initial RA Response is sent (at 720) with value of 1283 and then another RA Response is sent (at 725) in a subsequent subframe with a timing advance value of 718.

Figure 8:
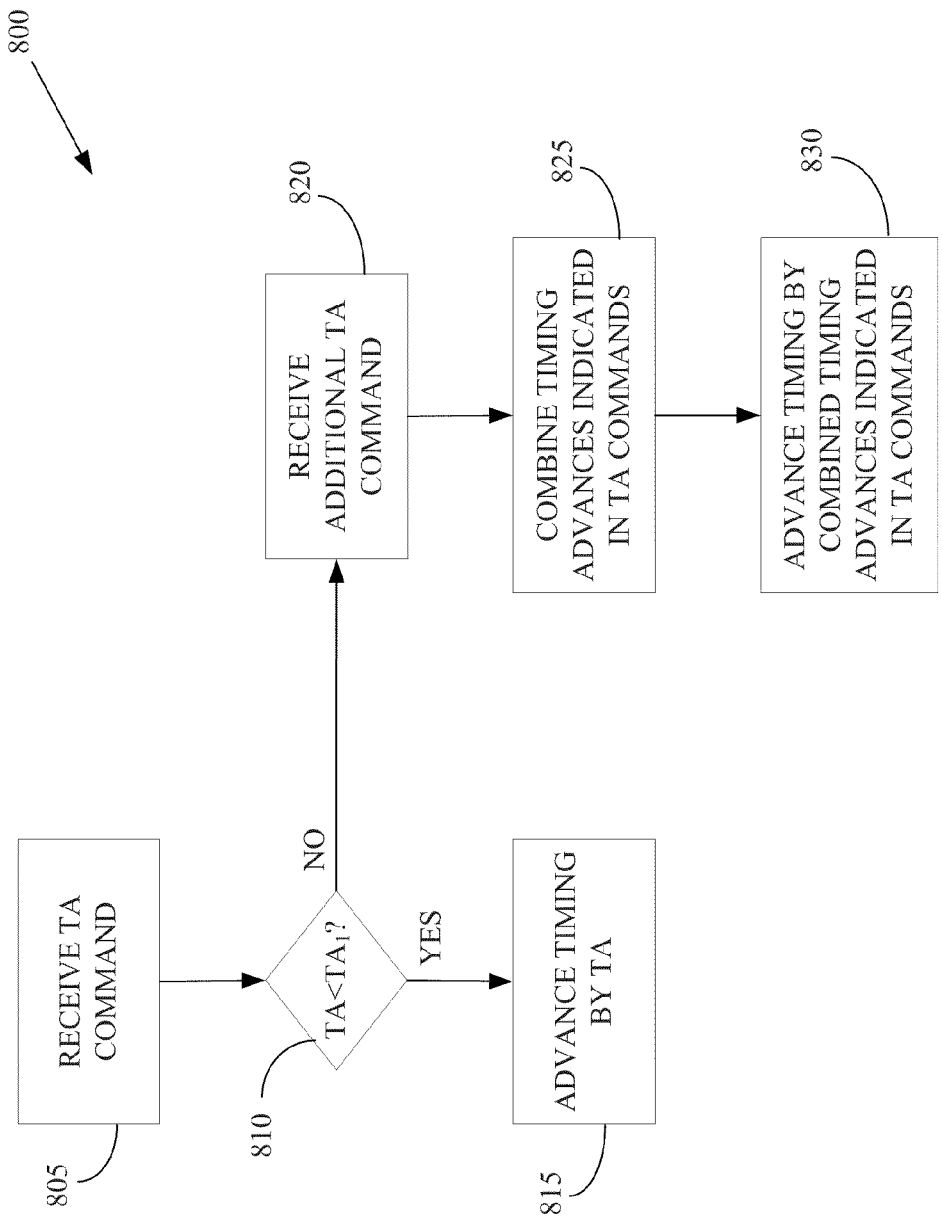
FIG. 8 conceptually illustrates one exemplary embodiment of a method for receiving timing advance commands at a mobile unit.

FIG. 8 conceptually illustrates one exemplary embodiment of a method 800 for receiving timing advance commands at a mobile unit. In the illustrated embodiment, the mobile unit has transmitted a random-access message over the air interface to the base station. For example, during the initial access procedure, the mobile unit may transmit a random access preamble in a pre-determined subframe. The mobile unit may then wait for a response from the base station. For example, the mobile unit may monitor a common search space (e.g., a physical downlink control channel, PDCCH) for a Random Access Response identified by the RA-RNTI within a preconfigured window. The RA Response window starts at three subframes after the end of the preamble transmission. The window length is configured by a higher-layer parameter, e.g., using the ResponseWindowSize in the RACH-ConfigCommon information element (IE) in the radio resource control (RRC message).

In the illustrated embodiment, the mobile unit receives (at 805) a response including a timing advance command from the base station. The mobile unit then determines (at 810) whether the timing advance command is within the range supported by a single timing advance command. If so, the mobile unit can process the timing advance command and advance (at 815) its timing to synchronize with the base station. For example, if the Random Access Response contains a Random Access Preamble identifier corresponding to the transmitted Random Access Preamble, the mobile unit can consider this Random Access Response reception successful, process the received Timing Advance Command, and perform (at 815) a time alignment procedure, e.g. as described in Section 5.2 of TS 36.321. In one embodiment, the mobile unit may have a configurable timer timeAlignmentTimer that is used to control how long the mobile unit is considered uplink time aligned. In one embodiment, the mobile unit may also apply the timing advance command when a Timing Advance Command MAC control element is received in the Random Access Response message. The mobile unit may also start or restart timeAlignmentTimer. When the Random Access Preamble was not selected at the MAC layer in the mobile unit, the mobile unit may apply the Timing Advance Command and start or restart timeAlignmentTimer. Otherwise, if the timeAlignmentTimer is not running, the mobile unit may apply the Timing Advance Command and start timeAlignmentTimer. When contention resolution is considered not successful, the mobile unit may stop timeAlignmentTimer. Otherwise, the mobile unit may ignore the received Timing Advance Command. When timeAlignmentTimer expires, the mobile unit may flush all HARQ buffers, notify RRC to release physical uplink control channel resources (PUCCH/SRS), and clear any configured downlink assignments and uplink grants.

The mobile unit may wait and receive (at 820) an additional timing advance command when the mobile unit determines (at 810) that the timing advance command is outside the range supported by a single timing advance command. The mobile unit can then combine (at 825) the timing advance as indicated in the initial and additional timing advance commands as discussed herein. Timing of the mobile unit may be advanced (at 830) using the combined timing advance as indicated in the multiple timing advance commands. In one embodiment, once the Timing Advance Command is received in a RA Response message, the mobile unit is configured to allow reception of TA commands in multiple sub-frames. For example, if the received Timing Advance Command is within the allowed the index value $T_A$ (0, 1, 2 . . . 1282), the mobile unit may apply (at 815) the Timing Advance Command. Otherwise, if the received Timing Advance command is outside the allowed the index value $T_A$ (0, 1, 2 . . . 1282), the mobile unit may apply the Timing Advance Command assuming the index value $T_A$ of 1282 and wait for a Random Access Response message within the allowed the index value $T_A$ (0, 1, 2 . . . 1282) until the received Timing Advance Command falls within the allowed index value $T_A$ (0, 1, 2 . . . 1282). For example, if the base station determines a needed Timing Advance index value 2000, the mobile unit may receive (at 805), an initial RA Response with Timing Advance value of 1283. Another RA Response may then be received (at 820) in a subsequent subframe with Timing Advance value of 718. The mobile unit can then apply (at 830) the combined Timing Advance value of 2000 for transmission of RA message 3.

In summary, the present application describes embodiments of an alternative approach for cell range extension. The proposed techniques are based on the base station and/or eNB capability to estimate round-trip delay corresponding to a large cell radius and to generate Timing Advance Commands that are transmitted in multiple RA Response messages. Embodiments of the techniques described herein provide a modular way to support extended cell range beyond the Timing Advance command range, which is currently limited to 100 km.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for implementation in a base station, comprising:
   determining whether a mobile unit is within a first range corresponding to a range of timing advances supported by a timing advance command; and
   transmitting a plurality of timing advance commands to the mobile unit when the mobile unit is outside the first range so that the mobile unit can synchronize with the base station using a sum of a plurality of timing advances in the plurality of timing advance commands.

2. The method of claim 1, wherein determining whether the mobile unit is within the first range comprises searching signals received on a random access channel in at least one first timing window corresponding to the first range and searching the signals received on the random access channel in at least one second timing window corresponding to at least one second range that is beyond the first range.

3. The method of claim 2, wherein determining whether the mobile unit is within the first range comprises searching signals received on a random access channel in at least one first timing window corresponding to a first range of 100 km and searching the signals received on the random access channel in at least one second timing window corresponding to at least one second range from 100 km to 200 km.

4. The method of claim 2, wherein searching signals received in said at least one first timing window and in said at least one second timing window comprises concurrently searching signals received in said at least one first timing window and said at least one second timing window using a plurality of detectors implemented in the base station.

5. The method of claim 2, wherein searching signals received in said at least one first timing window and said at least one second timing window comprises searching signals received in said at least one first timing window using a detector implemented in the base station and subsequently searching signals received in said at least one second timing window using the detector implemented in the base station.

6. The method of claim 1, wherein determining whether the mobile unit is within the first range comprises determining whether the mobile unit is within a range of timing advances that can be signaled using a timing advance message having a predetermined number of bits.

7. The method of claim 1, wherein transmitting the plurality of timing advance commands comprises transmitting a first timing advance command including a first value of a timing advance that is outside the range supported by the timing advance command to indicate that at least one second timing advance command is going to be transmitted.

8. The method of claim 7, wherein transmitting the plurality of timing advance commands comprises transmitting said at least one second timing advance command including at least one second value of the timing advance such that the first value and said at least one second value can be added to form sum indicating a timing advance corresponding to a distance outside of the first range.

9. The method of claim 1, comprising transmitting a reference timing signal concurrently with the plurality of timing advance commands so that the mobile unit can synchronize to the reference timing signal using the plurality of timing advance commands.

10. A method for implementation in a mobile unit, comprising:
    receiving, from a base station, a plurality of timing advance commands when the mobile unit is outside a first range corresponding to a range of timing advances supported by a timing advance command;
    synchronizing the mobile unit to the base station using a sum of a plurality of timing advances in the plurality of timing advance commands.

11. The method of claim 10, comprising transmitting signals on a random access channel and wherein receiving the plurality of timing advance commands comprises receiving the plurality of timing advance commands when the base station determines that the mobile unit is outside the first range based upon the signals transmitted on the random access channel.

12. The method of claim 11, wherein receiving the plurality of timing advance commands comprises receiving the plurality of timing advance commands when the base station determines that the mobile unit is outside a first range of 100 km.

13. The method of claim 10, wherein receiving the plurality of timing advance commands comprises receiving the plurality of timing advance commands when the base station determines that the mobile unit is outside the first range corresponding to a range of timing advances that can be signaled using a timing advance message having a predetermined number of bits.

14. The method of claim 10, wherein receiving the plurality of timing advance commands comprises receiving a first timing advance command including a first value of a timing advance that is outside the range supported by the timing advance command to indicate that at least one second timing advance command is going to be transmitted.

15. The method of claim 14, wherein receiving the plurality of timing advance commands comprises transmitting said at least one second timing advance command including at least one second value of the timing advance such that the first value and said at least one second value can be added to form the sum indicating a timing advance corresponding to a distance outside of the first range.

16. The method of claim 14, comprising determining the timing advance by adding said at least one second value of the timing advance to the maximum value of the timing advance within the range supported by the timing advance command.

17. The method of claim 10, comprising receiving a reference timing signal concurrently with receiving the plurality of timing advance commands and synchronizing to the reference timing signal using the plurality of timing advance commands.

* * * * *